United States Patent

[11] 3,577,809

| [72] | Inventors | Walter Brandl<br>Bad Homburg vor der Hohe;<br>Rudolf Mathes, Niedereschbach, Germany |
|---|---|---|
| [21] | Appl. No. | 754,612 |
| [22] | Filed | Aug. 22, 1968 |
| [45] | Patented | May 4, 1971 |
| [73] | Assignee | Reimers Getriebe A. G.<br>Zug, Switzerland |
| [32] | Priority | Aug. 30, 1967 |
| [33] | | Germany |
| [31] | | P 16 02 941.7 |

[54] QUICKSET TOOLHOLDER
2 Claims, 15 Drawing Figs.

[52] U.S. Cl. .................................................. 408/186,
90/11
[51] Int. Cl. .................................................. B23b 29/034
[50] Field of Search .......................................... 77/58, 58.3,
58.34, 58.37, 58.32, 56, 57; 90/11.1

[56] References Cited
UNITED STATES PATENTS

| 122,243 | 12/1871 | Flower | 77/57 |
| 456,462 | 7/1891 | Allen | 77/58 |
| 1,341,565 | 5/1920 | Krepps | 77/58 |
| 2,998,737 | 9/1961 | Yogus et al. | 77/58 |
| 3,068,727 | 12/1962 | Wertman | 77/58 |
| 3,344,690 | 10/1967 | Proksa | 77/58 |

FOREIGN PATENTS

| 3,585 | 2/1909 | Great Britain | 77/56 |
| 108,642 | 10/1939 | Australia | 77/56 |
| 421,186 | 11/1925 | Germany | 77/58 |

*Primary Examiner*—Gerald A. Dost
*Attorney*—Jennings Bailey, Jr.

ABSTRACT: A toolholder for holding cutting tools is provided with a standard cone at its rear end for insertion into a machine tool. The front end consists of an axially projecting stud. Disc-shaped tool carriers are provided with a central bore and further with means for receiving and holding at least one cutting tool. By means of their bore, the tool carriers are arranged on the stud to which they are positively secured by clamping means, for example, by a bayonet coupling. The distance between the nose of the cutting tools and the rear surface of the tool carriers is at all carriers set to a uniform predetermined range, thereby avoiding any shifting of the zero-point when one tool carrier is exchanged for another one.

Patented May 4, 1971
3,577,809
4 Sheets-Sheet 1
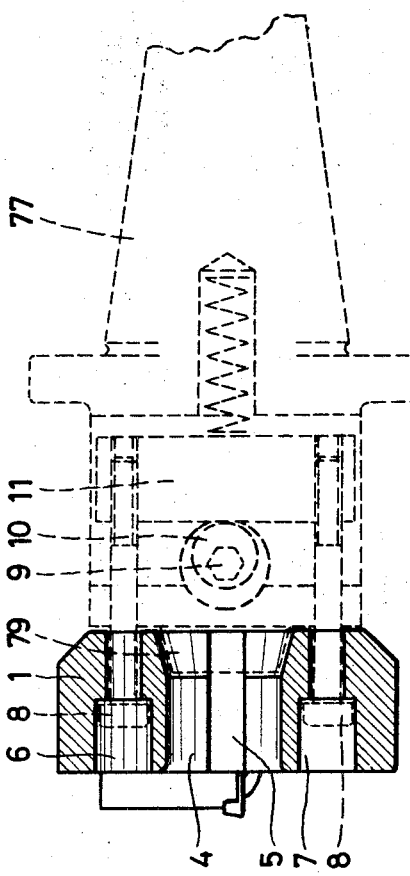
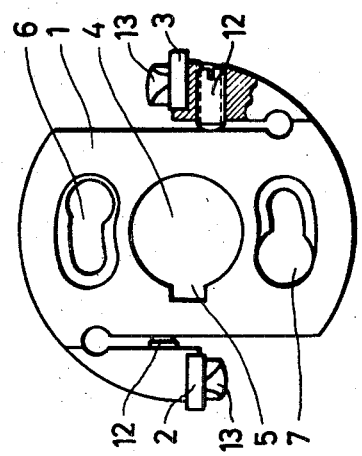
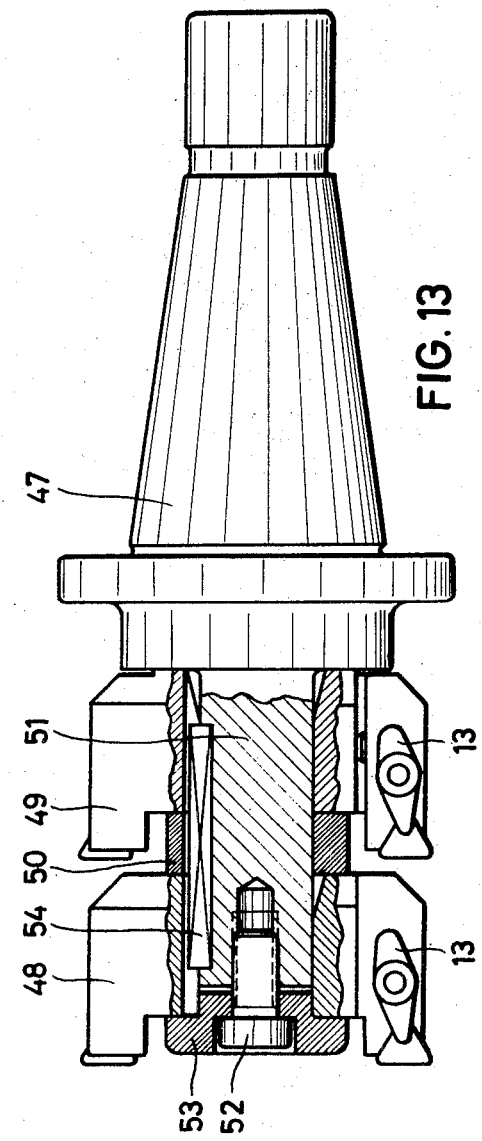
INVENTOR.
WALTER BRANDL
RUDOLF MATHES
BY
Jennings Bailey Jr INVENTOR.
WALTER BRANDL
RUDOLF MATHES
BY
Jennings Bailey Jr Patented May 4, 1971
3,577,809
4 Sheets-Sheet 3
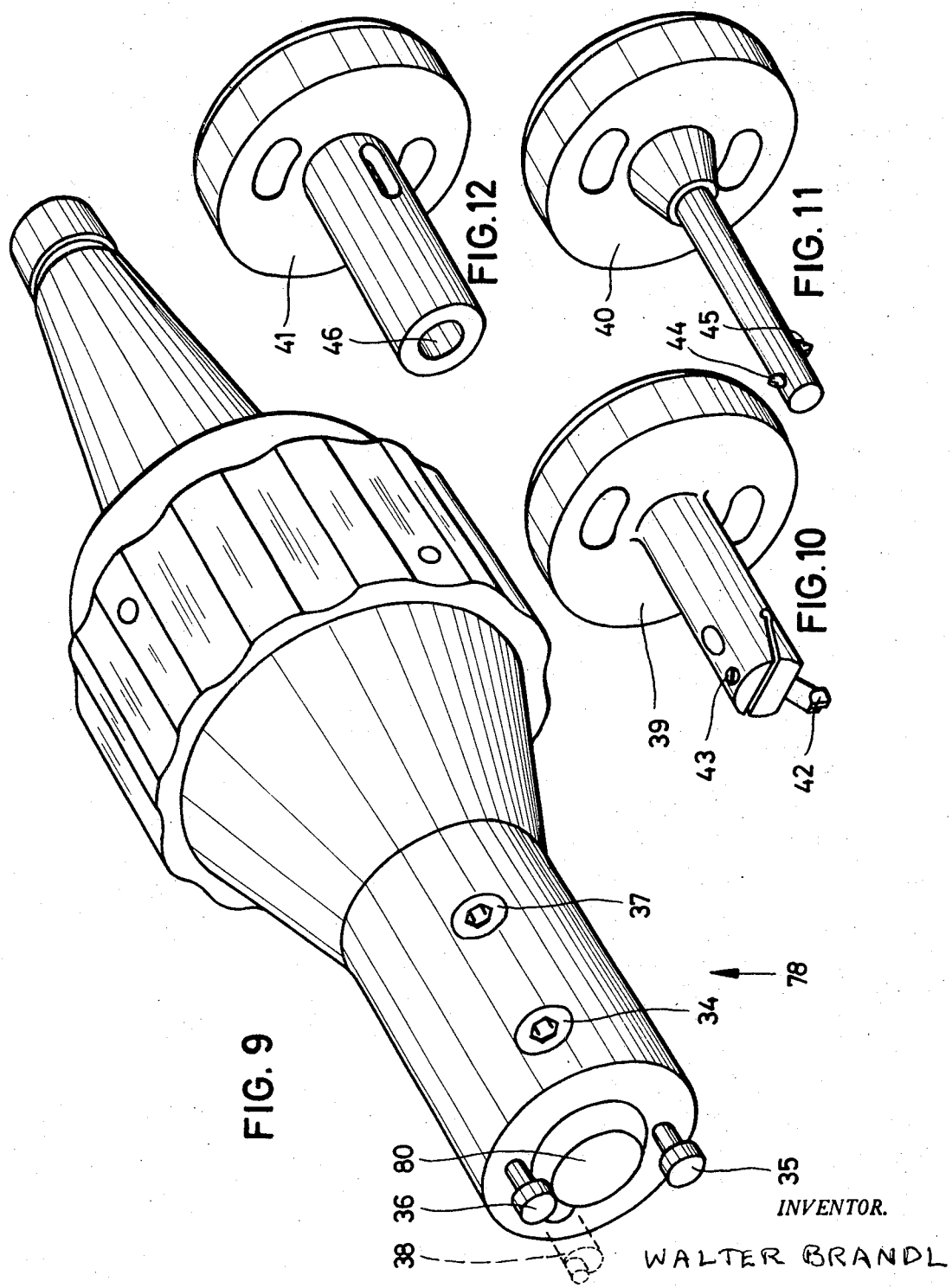
INVENTOR.
WALTER BRANDL
RUDOLF MATHES
BY
Jennings Bailey, Jr.

Patented May 4, 1971

INVENTOR.
WALTER BRANDL
RUDOLF MATHES
BY
Jennings Bailey J

QUICKSET TOOLHOLDER

BACKGROUND OF THE INVENTION

1. Field of the Invention

The present invention relates to a toolholder for cutting tools which toolholder is to be inserted into a machine tool.

2. Description of the Prior Art

Quickset toolholders of the above described nature have up to now been used only for boring tools. Usually the holder has been provided with a standard cone and the boring tool has been arranged so as to protrude radially from the holder in which direction it may have been displaceable.

Exchange of this type of toolholder in the machine requires release of the cone from the drilling spindle which, however, can only be accomplished by the impact of a relatively great force, for example, by punching a wedge through the spindle or by using another suitable device. This proves necessary because owing to the cutting reaction and the feed reaction during cutting shaping, the cone is firmly jammed in the spindle.

Before tool exchange, a withdrawal of either the toolholder or workpiece is required. This withdrawal corresponds to the length of the cone. After the exchange, the toolholder or workpiece is readjusted to the previous position. These two adjustments are unfavourable in setup and shutdown time. The latter, however, is becoming more and more important in recent times, due to the greater cutting speeds allowed by the modern cutting tools.

Moreover, every tool exchange—particularly with program-controlled boring or drilling machines—requires a renewed zero-point adjustment which cancels the shortened processing time previously achieved by the program-controlled machine. Additionally, such a system of quickset toolholders requires the investment of high sums of money for its manufacture and needs a large storage space.

One has, therefore, already changed to toolholders which are designed so that the holder having a standard cone at its rear end is provided with a receptacle for a plurality of boring tools, so that the latter can be pivoted about an eccentric stud on the front face of the holder. This makes it possible to apply different tools, one after the other, without exchanging the entire holder each time.

Unfortunately, with this type of toolholder, only one boring tool can be put to work at the time, so that the cutting reaction exerted on the tool must be absorbed completely by the toolholder alone. The latter must, therefore, be extremely sturdy, since, otherwise, the bore would not reach the desired measure on account of a possible bending of the holder. Also, in case of an eccentric premanufactured bore, as might result from defects in casting, the bore will remain slightly eccentric in spite of the shaping. Application of only one cutting tool also limits the rate of feed so that the production capacity of the machine tool cannot be utilized to its fullest extent.

Further, there is known a relatively heavy boring tool carrier provided with two pairs of cutting tools disposed opposite each other, the distance, in a radial direction, being adjustable. This carrier is securable to a suitably formed toolholder by means of a bayonet coupling. On the holder, the carrier is centered by a shoulder that fits into the holder. This implement is also relatively complicated and can be manufactured only with great expense.

It is, therefore, an object of the present invention to provide a quickset toolholder which is simple in design, light and inexpensive to produce. It is a further object to provide a quickset toolholder with which the tools can be exchanged readily and without zero-point displacement, and with which the tools can be set up apart from the machine tool. Another object of the invention is to provide a quickset toolholder which is particularly suited for the shaping of single workpieces or small series of workpieces which are repeatedly to be processed in certain time intervals.

Still another object is to provide a quickset toolholder which, besides boring, can also be used for planing faces. During this working process, all forces exerted on the toolholder in a radial direction are to be prevented as far as possible.

SUMMARY OF THE INVENTION

These objects of the invention are attained by providing a disc-shaped toolcarrier on which the cutting tools are mounted. The toolcarrier has a central bore by means of which the carrier is placed, without slackness, on a stud, projecting from the front face of the toolholder in which position the carrier is secured by suitable clamping device. Such disc-shaped toolcarriers can be produced easily and inexpensively in different, required sizes. During the shaping of a workpiece, the disc-shaped toolcarriers are exchangeable by a few manipulations while the toolholder remains mounted in the machine spindle. Thus the actual processing time will be only shortly interrupted for an exchange of tools.

Further, it has proven advantageous to set the spacing between the nose of the cutting tool and the rear face of the toolcarrier at a uniform distance. This prevents any zero-point displacement during tool exchange. The absence of such displacement being particularly advantageous with program-controlled machine tools.

Advantageously, there are at least two cutting tools mounted symmetrically on each tool carrier so that the radial forces exerted on the toolholder by the tools compensate for each other and can be neglected when the toolholder is designed.

The cutting tools can be adjustable on the toolcarrier in a manner known per se. Thus it is possible to set up the tools in the carrier before attaching the carrier to the holder, so that this operation also does not influence the machining time unfavourably. A slight readjustment of the setup may be necessary only when the toolcarrier is mounted for the first time on the holder, for example, if, with a stationary workpiece, the toolholder slightly rotates out of center. In order to ensure that the toolcarrier with the tool is mounted in the same position relative to the toolholder when the toolcarrier is mounted for a new use, the clamping means which secure the toolcarrier to the toolholder and which are of the bayonet coupling type can be formed unsymmetrically in the sense that the cooperating parts of the coupling on the holder and on the carrier are of different diameter.

The disc-shaped toolcarrier can also be used for shaping small size bores if it is provided with a central stud adapted to receive the smaller cutting tools. Also, for the cutting of grooves, the toolcarriers can be provided with carriages which are displaceable normal to the feed direction. In this case the toolholders are equipped with a device known per se by means of which this lateral displacement can be accomplished. The advantages of a quick tool exchange and of an unshifted zero-point are also maintained with these toolcarriers.

According to a further embodiment of the invention, the toolholder is formed so as to hold more than one toolcarrier. These are all arranged in a row on the projecting stud of the toolholder. With such a tool the workpiece can even be finished in one working process. Further, if there is a series of workpieces to be processed, each, for example, fitting different models of a certain machine, and therefore, possible varying only with one measure, then these workpieces may also be shaped with one uniform set of tools, exchanging only this one toolcarrier which holds the tool that processes the differing measure.

DESCRIPTION OF THE DRAWINGS

The invention will be more readily comprehended from the following description when taken in conjunction with the appending drawings, wherein:

FIG. 1 is a plan view of a toolcarrier,

FIG. 2 is a sectional view of a toolcarrier clamped to a toolholder shown in dotted lines, FIG. 9 is a toolholder of special design, FIGS. 10 and 11 show toolcarriers for the manufacture of smaller bore, FIG. 12 shows a toolcarrier that holds special tools, FIG. 13 shows a toolholder on which two toolcarriers are mounted.

DESCRIPTION OF THE PREFERRED EMBODIMENTS

Figure 7:
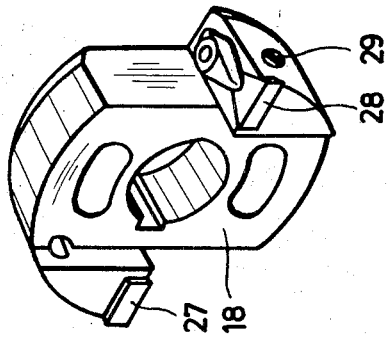
FIG. 7 shows a tool for final boring.

FIGS. 1 and 2 illustrate a plan view and a sectional view of the basic design of a toolcarrier 1 whereon two reversing cutting plates 2 and 3 are symmetrically arranged for compensation of the cutting reaction, the plates being secured by the retaining clip 13. Exact adjustment of the cutting plates 2, 3 to the required distance from the longitudinal axis of the toolholder is performed by means of the two setscrews 12.

The central bore 4 in the toolcarrier is of partial cylindrical and of partial conical shape so that different tool carriers having corresponding bores may be used optionally. However, if the stud on the toolholder is cylindrical, the bore 4 may also be cylindrical through its entire length. Further, the central bore 4 is provided with a groove 5 in which a spring of the toolcarrier 1 catches, thus preventing the latter from being twisted. Two oblong holes 6 and 7 of unequal cross section having the axis extending in a circle serve as a socket for two bolts on toolholder 77, together with which they form a bayonet coupling.

After the toolcarrier 1 has been placed on toolholder 77 and has been secured thereto by turning, thus interlocking the parts of the bayonet coupling, a yoke 11 is displaced in the direction of the toolholder by means of a screw 9 and an eccentric roller 10. The bolts 8 are integral parts of this yoke 11.

Figure 8:
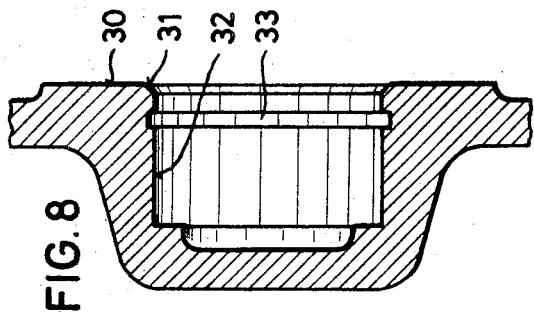
FIG. 8 shows a workpiece that is to be shaped by tools shown in FIGS. 3 through 7.

In the FIGS. 3 to 7 disc-shaped toolcarriers 14 to 18 are illustrated which perform the various working processes that the workpiece shown in FIG. 8 has to undergo.

Figure 3:
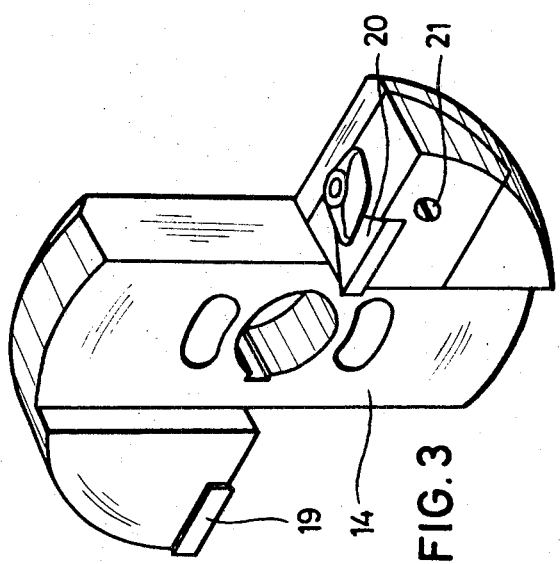
FIG. 3 shows a tool for planing.

The toolcarrier 14 shown in FIG. 3 is provided with two cutting tools 19 and 20. The tools are offset from each other in such a way that the face 30 (FIG. 8) of the workpiece can be planed over its full width in one process. One of the two cutting tools can be displaced in feed direction by means of a screw 21 which renders the tools adjustable in the direction normal to the toolholder axis.

Figure 4:
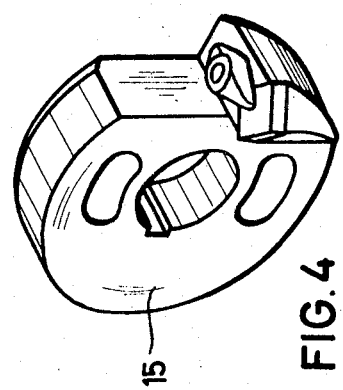
FIG. 4 shows a tool for cutting chamfers.

The tool depicted in FIG. 4 consists of a disc-shaped toolcarrier 15 on which a cutting plate for cutting the chamfer 31 of the workpiece illustrated in FIG. 8 is fastened.

Figure 5:
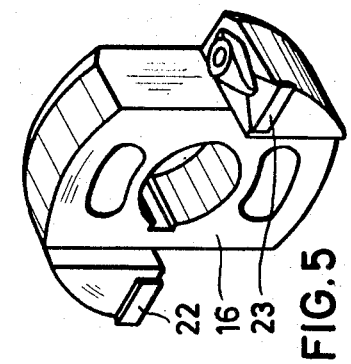
FIG. 5 shows a tool for boring a smaller hole first.

The tools resembling each other in FIG. 5 and 7 are used for boring a smaller bore first and then finishing that bore 32 in the workpiece (FIG. 8). To this end, the disc-shaped toolcarriers 16, 18 respectively are provided with two cutting plates each 22, 23 and 27, 28, which are arranged opposite to each other. While with the tool shown in FIG. 5 a mechanism for the exact adjustment of the cutting planes in a radial direction is not absolutely necessary, such a mechanism is provided with the tool for final shaping as shown in FIG. 7. With this tool the radial position of the cutting plates 27, 28 may be adjusted precisely by operating the screws 29.

Figure 6:
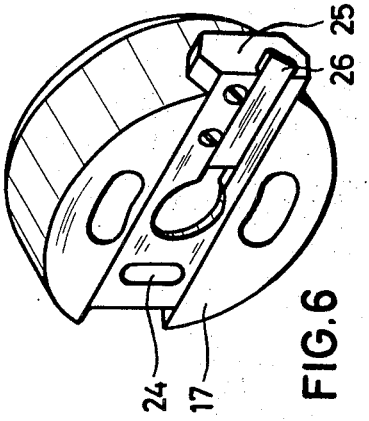
FIG. 6 shows a tool for cutting a groove.

For cutting the groove 33 in the workpiece (FIG. 8), a tool as shown in FIG. 6 is used, inserted between the tools shown in FIG. 5 and 7. The disc-shaped toolcarrier of this tool has a carriage which is displaceable normal to the feed direction and carries a cutting tool that extends in a radial direction.

The application of a tool as shown in FIG. 6 requires a special toolholder as is depicted in FIG. 9. With this special toolholder the screws 35 and 36 are alternately movable to a toolcarrier clamping position and to a releasing position by the turning of another screw 34 already described in connection with FIG. 2. A further screw 37 serves to bring out and to withdraw the eccentric stud 38, as this may be required. When bringing out the stud 38, the drive for the turning motion is at the same time coupled to this stud.

The latter engages an oblong hole 24 in the carriage 25 (FIG. 6), so that the carriage, and therewith the cutting tool 26, can be advanced in a radial direction and can be withdrawn automatically after the groove has been completed.

In case a tool as shown in FIG. 6 is used, it need not be mentioned that the required special toolholder (FIG. 9) is also to be used for all the other working processes. Thus a new zero-point adjustment, which is necessary after an exchange of the toolholder, is avoided.

FIGS. 10 to 12 illustrate disc-shaped toolholders particularly suitable for the manufacture of narrow holes. To this end, the toolcarriers are provided with a centrically projecting stud which is adapted to hold the cutting tools. This cutting tool 42 can be displaced in a radial direction by means of a screw as shown in FIG. 10. However, it is also possible to arrange on the centrically projecting stud a plurality of nondisplaceable cutting tools, such as the ones designated by the reference numerals 44 and 45 in FIG. 11. These cutting tools are advantageously arranged in pairs and are symmetrical to the toolholder axis, as a consequence whereof the cutting reactions exerted on the tools compensate for each other. Moreover, the centrically projecting stud can be provided with a conical hole 46 into which a drill, having a corresponding shaft, may be inserted.

In a further developed embodiment of the invention, a plurality of toolcarriers is disposed in a row on one toolholder. Such a combination of several toolcarriers on one toolholder is illustrated in FIG. 13. With this combination, if a simple through hole is drilled, a smaller hole can be drilled first and the final hole can be drilled thereafter, all in one working process. The combination consists of the toolholder 47 having a cylindrical stud 51 on which two toolcarriers 48, 49, with a spacer 50 between them, are disposed. By means of a central screw 52 and a washer 53, the combination is clamped to the toolholder. A tongue 54 which engages in a groove in the toolholder as well as in grooves in the toolcarriers 48, 49 is provided. This tongue-and-groove arrangement serves to prevent any rotatory displacement of the toolcarriers on the stud of the toolholder. This displacement might occur under the influence of the cutting reaction exerted on the cutting tools.

Figure 15:
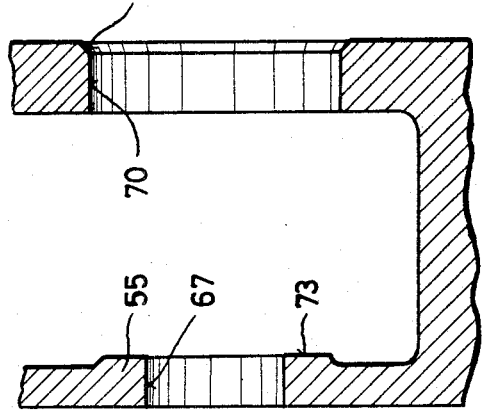
FIG. 15 is a workpiece that can be shaped by a tool shown in FIG. 14.

In special cases, however, even far more complicated workpieces can be manufactured in a single working process. An example of such a workpiece is shown in FIG. 15. This workpiece comprises two through holes. The holes are coaxial and are in two separate walls; thus they are spaced from each other.

Figure 14:
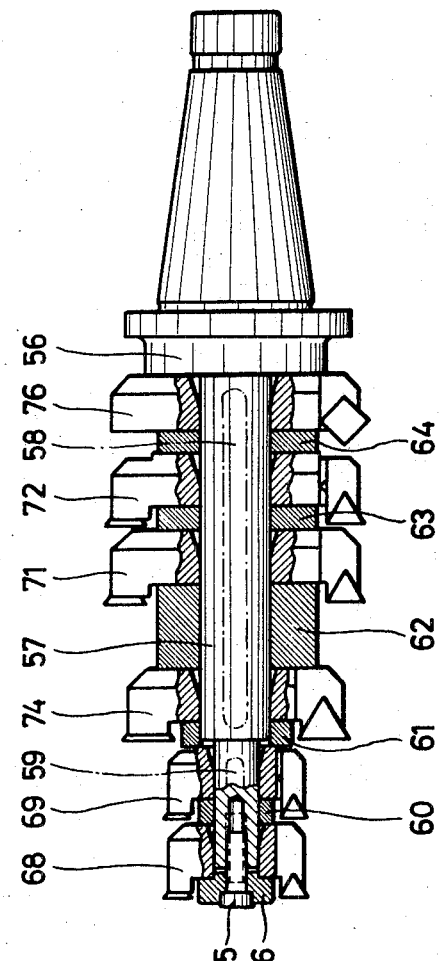
FIG. 14 shows a toolholder with six toolcarriers.

FIG. 14 shows the toolholder with toolcarriers and the cutting tools which are needed for the manufacture of these holes. The device comprises the toolholder 56, having a projecting cylindrical stud whereon a total of six toolcarriers 68, 69, 71, 72, 74 and 76 is disposed. Inserted between them are the spacers 60 to 64, and the entire setup is secured to the toolholder 56 by the screw 65 with the washer 66 between the latter two.

The toolcarriers are again prevented from turning on the stud 57 by the tongues 58 and 59 which are placed in grooves in the toolholder and the toolcarriers.

Upon approaching the workpiece with this device, first the cutting tools of the toolcarriers 68 and 71 bore smaller holes in the place of the bores 67 and 70. The smaller holes are subsequently bored to the prescribed measure by the cutting tools of the toolcarriers 69 and 72. Upon further feed of the device, the final shaping of the plane face 73 by the cutting plates of the toolcarrier takes place. Simultaneously the chamfer 75 is cut by the cutting plate of the toolcarrier 76.

If, for example, several workpieces 55 are to be produced that are designed to fit different types of a certain machine, so that, as a consequence, the workpieces differ only by the measure of the bore 67, then these workpieces can be manufactured without difficulty in one series by a tool as shown in FIG. 14, without having to exchange the entire toolholder. While the toolholder 56 together with the toolcarriers 71, 72, 74 and 76 and the spacers 61 to 64 remains in the spindle, it is only necessary to exchange the toolcarriers 68 and 69.

I claim:

1. A quickset toolholder for interchangeably mounting cutting tools on a machine took, said toolholder comprising in combination: a holder having a coupling member at its rear end; a plane front surface and a stud which projects from said surface; at least one disc-shaped toolcarrier having a concentric bore and adapted to be arranged on said stud by means of said bore; means on said toolcarrier for receiving and holding said cutting tools in a position wherein the distance between the nose of said cutting tools and the rear face of said carrier is set to a predetermined range; screws projecting from said plane front surface and oblong holes which extend along a circular axis provided in said carrier, said screws and holes constituting a bayonet coupling, and an eccentric shaft journaled in said holder in a direction perpendicular to the holder axis, said shaft being adapted to secure said screw heads in said oblong holes.

2. A quickset toolholder according to claim 1, wherein the spacing between the nose of the cutting tool and the rear face of said toolcarrier is set to a uniform distance.